United States Patent
Gosselin

(10) Patent No.: US 8,925,839 B2
(45) Date of Patent: Jan. 6, 2015

(54) SPREADER FOR FORESTS

(75) Inventor: Daniel Gosselin, Saint-Ephrem de Beauce (CA)

(73) Assignee: Innovation Danago Inc., St-Ephrem de Beauce (CA)

( * ) Notice: Subject to any disclaimer, the term of this patent is extended or adjusted under 35 U.S.C. 154(b) by 671 days.

(21) Appl. No.: 13/097,498

(22) Filed: Apr. 29, 2011

(65) Prior Publication Data

US 2012/0193457 A1 Aug. 2, 2012

(30) Foreign Application Priority Data

Feb. 17, 2011 (CA) ...................................... 2732156

(51) Int. Cl.
*A01C 3/06* (2006.01)
*A01C 15/04* (2006.01)
*A01C 15/12* (2006.01)

(52) U.S. Cl.
CPC ............... *A01C 15/04* (2013.01); *A01C 15/122* (2013.01)
USPC ........... 239/654; 239/142; 239/650; 239/661; 239/672; 239/675; 406/39; 406/43

(58) Field of Classification Search
USPC .......... 239/14.1, 77, 142, 144, 650, 654, 672, 239/675, 661; 406/2, 39, 43, 52, 53
See application file for complete search history.

(56) References Cited

U.S. PATENT DOCUMENTS

| | | | |
|---|---|---|---|
| 2,511,514 A | 6/1950 | Rosselot | |
| 3,730,395 A | 5/1973 | Gallogly et al. | |
| 4,233,015 A | 11/1980 | Teague et al. | |
| 4,863,277 A | 9/1989 | Neal et al. | |
| 4,871,283 A | 10/1989 | Wright | |
| 5,725,160 A * | 3/1998 | Harper et al. | 239/654 |
| 6,012,656 A | 1/2000 | Anderson | |
| 6,402,068 B1 | 6/2002 | Handleman | |
| 6,511,263 B2 * | 1/2003 | Cutler | 406/2 |
| 6,715,696 B2 * | 4/2004 | Pierce | 239/661 |
| 6,715,702 B2 | 4/2004 | McPherson et al. | |
| 7,337,992 B1 * | 3/2008 | Blatt | 239/654 |
| 7,462,279 B2 | 12/2008 | Dixon et al. | |
| 2004/0163578 A1 | 8/2004 | McDonald et al. | |
| 2006/0144798 A1 | 7/2006 | Dixon et al. | |
| 2010/0072295 A1 | 3/2010 | Usmar et al. | |

FOREIGN PATENT DOCUMENTS

DE 3516561 11/1986

OTHER PUBLICATIONS

Stoltzfus, Wet Lime Spreader, publication date unknown.

* cited by examiner

*Primary Examiner* — Steven J Ganey
(74) *Attorney, Agent, or Firm* — Dority & Manning, P.A.

(57) ABSTRACT

The spreader has a movable container and at least one elongated tube, and can thus be moved along a path in the forest, and the tube successively deployed to blow the soil conditioner between the trees, away from the path. Satisfactory efficiency can be achieved using an eductor device to transfer the powdery soil conditioner into the air flow in the tube.

16 Claims, 3 Drawing Sheets

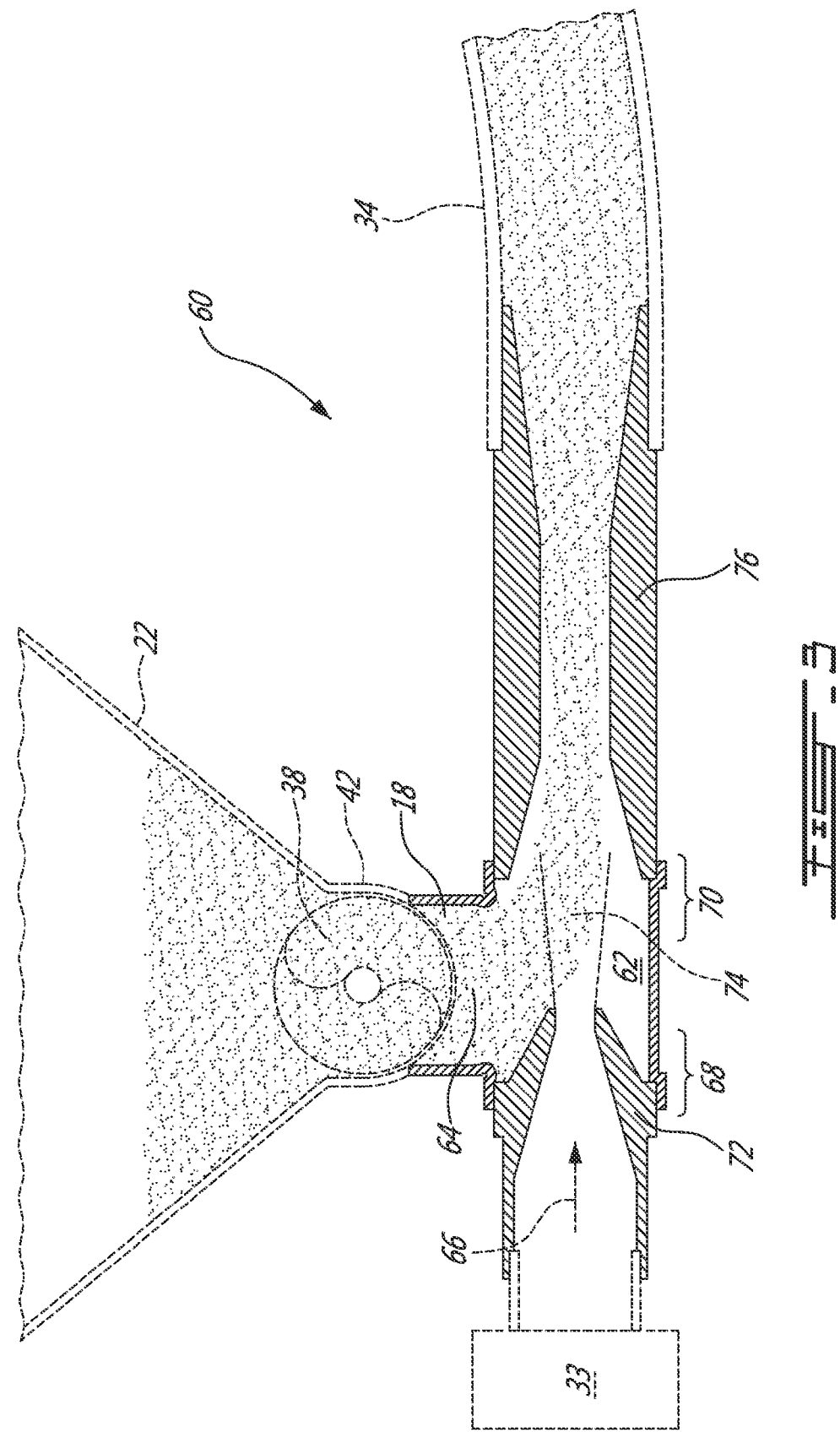

SPREADER FOR FORESTS

CROSS-REFERENCE TO RELATED APPLICATIONS

This specification claims priority of Canadian patent application no. 2732156 filed 17 Feb. 2011 by applicant, the contents of which are hereby incorporated by reference.

FIELD

This specification presents a vehicular machine which can be used to apply a soil conditioner such as lime to difficult access areas such as forests. It is characterized by the presence of elongated tubes. It can be used to increase the growth rate of trees for instance.

BACKGROUND

Spreaders are widely used in agriculture to provide soil conditioners or the like onto fields. This is known to improve the growth rate of crops and/or the yield of the eventual harvest and usually represents a highly worthwhile investment.

However some industries carry out some form of culture in terrain which represent accessibility challenges unknown to fields. Good examples of this are the industries of maple sugaring and wood harvesting which rely on the growth of trees, where although some paths are present at given areas where machinery can be driven, much of the culture surface is only accessible by foot.

The expected benefits of applying soil conditioners to such difficult access cultures has even increased in recent years, and it is now believed that applying a soil conditioner such as lime can even help in overcoming some drawbacks caused by atmospheric pollution/acid rains.

There was thus a need for a system which would be adapted for spreading a soil conditioner over vast areas in difficult access areas.

SUMMARY

In accordance with one aspect, there is provided a spreader which has a movable container and at least one elongated tube. The spreader can thus be moved along a path in the forest, and once the spreader is positioned at a given area, the tube can be deployed by hand-carrying it between the trees and handled to blow the soil conditioner evenly onto the forest ground.

It was found that the aerodynamic characteristics of the system to transfer the lime into the air flow in the tube are key in designing a satisfactory spreader which can have a tube sufficiently long to access far areas, sufficiently narrow to remain convenient to handle, and yet provide a satisfactory flow rate of lime in the air stream.

More particularly, in accordance with one aspect, it was found that satisfactory efficiency can be achieved using a device known as an "eductor" to transfer the powdery soil conditioner into the air flow.

In accordance with one aspect, there is provided a lime spreader comprising a wheeled frame having a container to carry the lime, the container having an outlet at a bottom thereof; an eductor having a lime inlet connected to the outlet of the container, an air inlet, and an outlet; a blower connected to the air inlet of the eductor, and an elongated flexible tube connected to the outlet of the eductor; wherein during operation, the blower drives the eductor to blow mixed air and lime through and out the tube as lime enters the eductor; wherein the wheeled frame can be moved along a path in a maple grove and the elongated tube can be deployed laterally from the path over an application distance, between the trees.

In accordance with another aspect, there is provided a spreader comprising a wheeled frame having a container to carry the lime, the container having an outlet at a bottom thereof; an eductor having a lime inlet connected to the outlet of the container, an air inlet, and an outlet; a blower connected to the air inlet of the eductor, and an elongated flexible tube connected to the outlet of the eductor.

In accordance with another aspect, there is provided a lime spreader comprising a wheeled frame having a container to carry the lime, the container having an outlet at a bottom thereof; an eductor having a lime inlet connected to the outlet of the container, an air inlet, and an outlet; means to convey the lime in the container to the container outlet; an elongated flexible tube connected to the outlet of the eductor; means to activate the eductor to blow lime entering the eductor from the container outlet through and out the tube.

Many further features and combinations thereof concerning the present improvements will appear to those skilled in the art following a reading of the instant disclosure.

It will be noted here that the lime spreader can useful to spread other materials than lime in a forest or otherwise difficult-access environment. One alternate environment can be a blueberry culture field, for instance.

DESCRIPTION OF THE FIGURES

In the figures,

FIG. 3 is a schematic lengthwise cross-sectional view of an eductor of the lime spreader in its environment.

DETAILED DESCRIPTION

Figure 1:
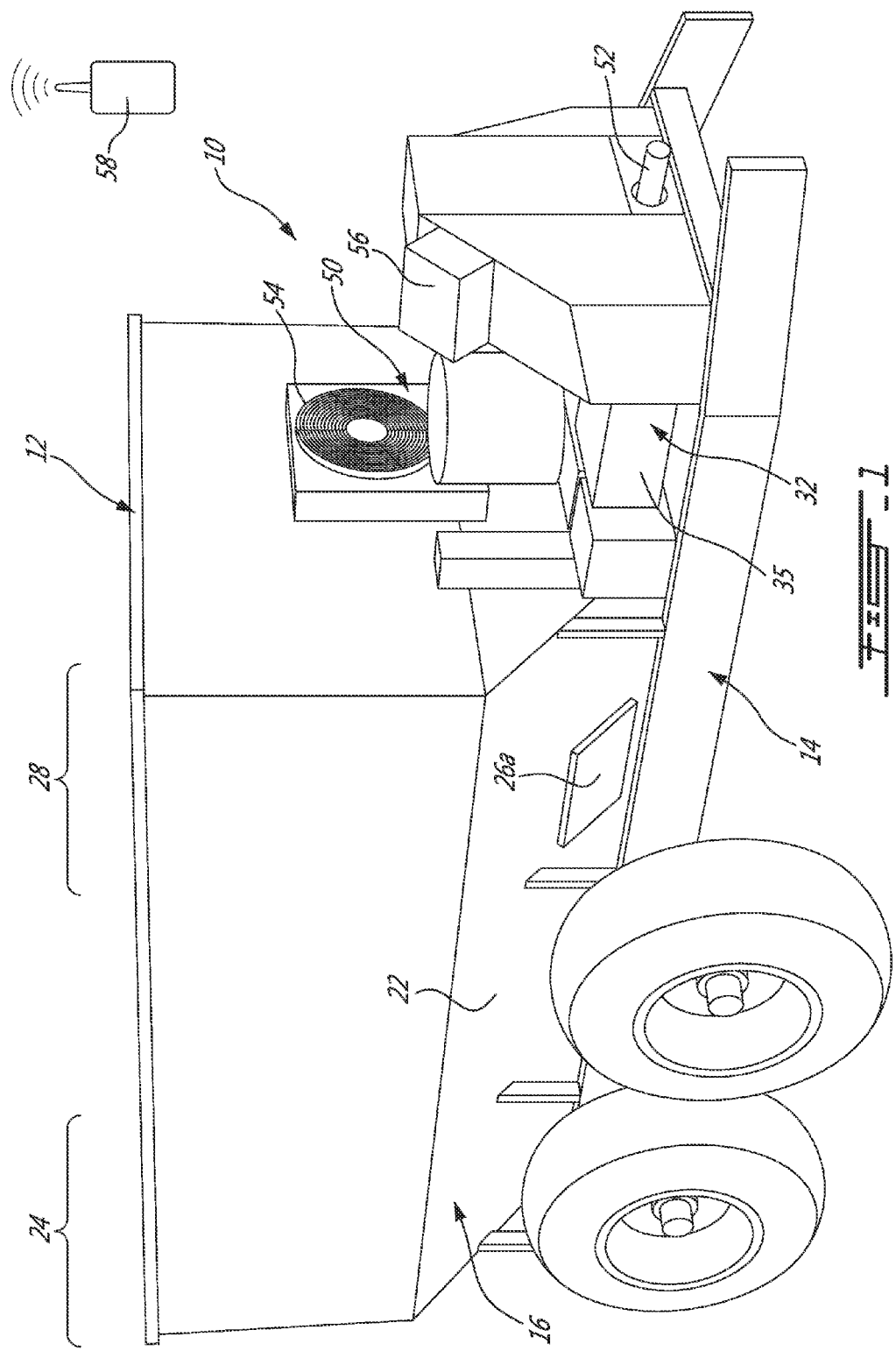
FIG. 1 is a schematic oblique view of an example of a lime spreader.
Figure 2:
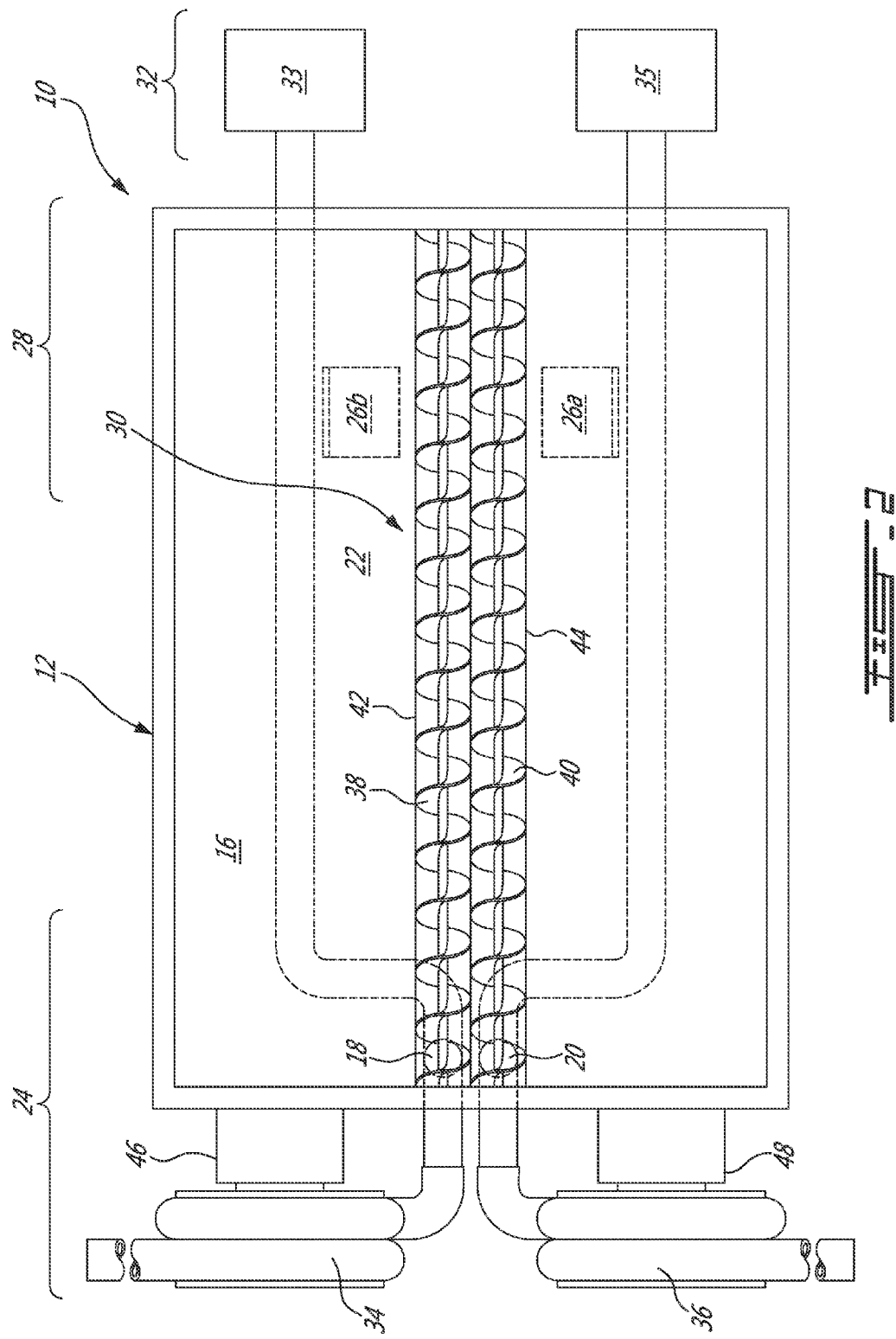
FIG. 2 is a schematic top plan view of the lime spreader.

FIGS. 1 and 2 show an example of a lime spreader 10. The lime spreader 10 can generally be seen to have a container 12 mounted on a wheeled frame 14. In this example, the lime spreader 10 is configured to be towed by a vehicle such as a tractor (not shown). Alternately, the lime spreader can be motorized, for instance. The container 12 can be seen to be relatively large, to allow handling significant amounts of lime, typically in the order of tons. The container 12 can have a converging bottom 16 to guide the contents toward a point of entry into an air stream. In this example, the converging bottom 16 consists of an elongated V-shaped lower section 22 and the point of entry into the air stream includes two outlets 18, 20 (FIG. 2) positioned at the rear end 24 of the lime spreader 10, and leading to the stream of air generated by a blower system 32 which carries the lime through and out the elongated tubes 34, 36. In this particular embodiment, the blower system 32 includes two distinct blowers 33, 35, one for each tube.

Lime is a particular material in the sense that it is typically provided in the form of a powder which tends to pack up in certain circumstances such as when the lowermost lime is compressed under the weight of the lime above. Such occurrences inside the container 12 can prevent significant quantities of lime to reach the outlet 18 and/or otherwise disrupt the lime spreader 10 intended operation. To ensure continuous sound operation of the spreader, it can be highly useful to have some form of means which can help convey the lime toward the bottom of the container by breaking up packed portions of lime back into powder. In the present example, vibration is used to this end. Henceforth, in this example, the lime spreader 10 includes two vibration devices 26a, 26b, one on each side of the container 12. Satisfactory efficiency was achieved with the vibration devices 26a, 26b being positioned at the front half 28 of the lime spreader 10, away from the outlet 18. In this particular embodiment, the vibration devices 26a, 26b are electric motors having an off-centered weight mounted to the shaft. In an alternate embodiment, the breaking up of the packed portions can be done using jets of air for example.

The lime spreader 10 of this example includes a conveyance system 30 to convey the lime toward the stream of air. In this particular example, endless screw conveyors 38, 40 are used, each one being received in a corresponding U-shaped channel 42, 44 ending with the corresponding one of two container outlets 18, 20. The vibration devices 26a, 26b can be considered to form part of the conveyance system 30. Corresponding tube racks 46, 48 can be used at the rear of the container 12 to stow the tubes 34, 36 when the spreader is not in operation. In an alternate embodiment, the lime spreader 10 can have a single container outlet and a single tube, for instance.

In this particular example, the spreader being adapted to be pulled by a tractor, several sources of energy are available from the tractor such as electricity, direct torque from the tractor PTO, and hydraulic power. In this particular case, it was decided to have the blower system 32 driven by the PTO via a torque shaft 52, the vibrator devices 26a, 26b driven by electricity, and the endless screw conveyors 38, 40 driven by a hydraulic system 50 which includes a radiator 54, among valves, hoses, and other typical components. In alternate embodiments, the spreader can be adapted to be carried in the box of a pick up truck, for instance, in which case it can be adapted to be powered by a generator or the like, for instance.

Referring back to FIG. 1, in this example, the lime spreader is provided with a receiver 56 and a remote controller 58. The receiver 56 is configured to drive the operation of the systems of the lime spreader 10 according to commands received from the remote controller 58. During operation, the lime spreader 10 can be carried along a forest path to a given forest area and then stopped. The tube(s) can be uncoiled and the tube outlets can be carried laterally away from the forest path, between trees. The remote controller 58 can be used to operate the lime spreader 10 to start/stop blowing lime by an operator handling the tube outlets to avoid needing another operator which would have had to stay with the wheeled frame/container to operate the commands, for instance.

In the example described above and illustrated in FIG. 1, tubes 34, 36 having a diameter of below 3 inches were preferred for handling purposes, and a range of above 150 feet in length were preferred for range. However, one very important factor in maintaining the spreader operation economically viable is to blow a sufficient application rate of the soil conditioner (which can be referred to as a given amount of soil conditioner pounds per minute of operation for instance). Up to a handling limit, the greater the application rate is, the more efficient the spreader will be. For instance, if the application rate is too slow, the operator handling the tube end will find it very long to cover the entire surface with a sufficient quantity, or "thickness" of the soil conditioner. The application rate should thus be aimed to be just about at the limit of what a trained operator can handle in terms moving the tube end between the trees and applying a satisfactorily even amount of soil conditioner over the entire area.

The application rate depends principally of the cross-sectional area of the tube(s), the speed at which the mixed air and lime powder are carried through the tube, and the concentration of lime in the tube, i.e. the lime to air ratio.

The cross-sectional area of the tube is directly linked to the tube diameter and shape. Apart from application rate considerations, handling and cost considerations exist which tend to favour posing a limit to the cross-sectional area of the tube. For instance, a larger tube requires more room to store and is heavier and more difficult to carry than a smaller one.

The speed at which the mixed air and lime powder can be carried through the tube is a function of the tube cross-sectional area, the capacity of the blower system, the amount of drag (or "head-loss") in the system. The capacity of blowers are typically rated in terms of cfm, that is cubic feet of air per minute at a given pressure. For a blower having a given capacity of cfm, the speed will be greater in a tube having a smaller cross-sectional area. The cross-sectional area of the tube and the roughness of the tube interior also affects air pressure in the tube and the head loss. Tubes having low-roughness interiors are preferred. Henceforth, it is important to have a blower which provides enough cfm's. However, as will be discussed below, there is a limit to increasing the capacity of the blower.

The concentration of lime in the blown air is highly dependent on the aerodynamic efficiency of the components which are used to mix the lime into the air stream. In this case, this is satisfactorily achieved using an eductor at the container outlet, the details of which will be provided below. With a system having a greater aerodynamic efficiency, it will be possible to have the lime fed into a given air stream/tube system at a higher rate, up to a certain limit which is linked to the size and the aerodynamic design of the eductor.

Turning to FIG. 3, an example of an eductor 60 is shown. The eductor 60 can be seen to generally include a chamber 62 which can be referred to as a mixing chamber as it is the portion of the eductor 60 where the lime mixes with the airflow. The mixing chamber has an opening 64, which can conveniently be positioned upwardly to receive lime moved through the container outlet 18 by the combined action of the conveyor 38, gravity, and aspiration. Relative to the air flow 66, the chamber 62 can be said to have an inlet side 68 and an outlet side 70. Preferably, a nozzle 72 is used to create a concentrated, high velocity stream of air 74, or jet, at the inlet side 68. The high velocity stream of air 74, given the viscosity of air, transfers some of its kinetic energy to the surrounding air and thereby accelerates it in an effect which is known as an "ejector effect". The ejector effect causes aspiration of lime through the lime inlet.

Even further aerodynamic efficiency can be achieved by using an eductor 60 having a converging-diverging outlet section 76 at the outlet side 70 of the chamber 62. With this particular design, the example lime spreader 10 described above and illustrated achieved highly satisfactory results in terms of rate of lime blowing. It will be noted here that in the illustrated embodiment, one distinct eductor is used for each tube 34, 36.

It will be noted here that even highly efficient eductors have a limit to the amount of soil conditioner which can be mixed into the air stream. To reach their limit, they have to be driven with blowers having a satisfactory capacity, to increase the application rate further, it will likely be required to increase the eductor size, and correspondingly increase the tube cross-sectional area.

A wide range of eductor sizes can be purchased from the company CON-V-AIR inc., and more particularly its Leap Engineered Products division having a place of business in St-Hubert, Québec, Canada. This company offers tables which can be used to select an eductor cross-sectional area for a desired rate of blowing, and a blower adapted to the selected, taking into account other aerodynamic characteristics of the system, or vice versa.

In this particular example of a 4T spreader with two tubes, the tubes were selected to have a circular cross-section with a diameter of 2 inches and a length of 200 feet. A corresponding 2-inch diameter eductor rated at 34 pounds/minute was selected, together with an appropriate blower having a capacity of 140 cfm at 12 lbs pressure, for each tube. For indicative purposes, the blowers were OMEGA™ rotary blowers manufactured by KAESER. On the field, using both tubes, and taking into account periods of moving and refilling the container and refilling an average application rate of roughly 1 ton per hour was reached. With this design, it was felt that the operators felt they could handle a greater amount of pounds/minute, which can be achieved with tubes/eductors having a higher diameter for instance and appropriate blowers.

The examples described above and illustrated are intended to be exemplary only. The scope is indicated by the appended claims.

What is claimed is:

1. A lime spreader comprising a wheeled frame having a container to carry the lime; an eductor having a lime inlet positioned to receive lime from a bottom of the container, an air inlet, and an outlet; a blower connected to the air inlet of the eductor, and an elongated flexible tube connected to the outlet of the eductor; wherein during operation, the blower drives the eductor to blow mixed air and lime through and out the tube as lime enters the eductor; wherein the wheeled frame can be moved along a path in a maple grove and the elongated tube can be deployed laterally from the path over an application distance, between the trees; wherein the eductor has a chamber having an inlet side opposite an outlet side, and an opening connected to the container, an inlet nozzle oriented into the chamber on the inlet side, and a converging-diverging outlet section receiving mixed air from the inlet nozzle and lime from the opening, extending away from the outlet side of the chamber.

2. The lime spreader of claim 1 wherein the container has an outlet at a bottom thereof, the eductor having the lime inlet connected to the outlet of the container.

3. The lime spreader of claim 1 wherein the container is horizontally elongated with at least a lower portion thereof having a V-shaped cross-section.

4. The lime spreader of claim 3 further comprising a conveyor to convey the lime at the bottom of the V-shaped cross-section to the lime inlet of the eductor.

5. The lime spreader of claim 4 wherein the conveyor is an endless screw conveyor.

6. The lime spreader of claim 1 further comprising a system to break up packed up portions of lime in the container.

7. The lime spreader of claim 1 further comprising a vibrator device mounted to the container.

8. The lime spreader of claim 1 having two of the eductor; and two elongated flexible tubes, each one connected to the outlet of a corresponding one of the two eductors.

9. The lime spreader of claim 1 wherein the tube is at least 70 feet long.

10. The lime spreader of claim 1 wherein the tube has at a diameter between 1.5 and 3 inches.

11. The lime spreader of claim 1 wherein the container has a capacity of at least 1.5 tons.

12. A spreader comprising a wheeled frame having a container to carry a soil conditioner; an eductor having a lime inlet positioned to receive lime from the container, an air inlet, and an outlet; a blower connected to the air inlet of the eductor, and an elongated flexible tube connected to the outlet of the eductor; wherein the eductor has a chamber having an inlet side opposite an outlet side, and an opening connected to the container, an inlet nozzle oriented into the chamber on the inlet side, and a converging-diverging outlet section receiving mixed air from the inlet nozzle and lime from the opening, extending away from the outlet side of the chamber.

13. The spreader of claim 12 wherein the container has an outlet at a bottom thereof; the eductor having the lime inlet connected to the outlet of the container.

14. The spreader of claim 12 wherein the container has a conveyance system operable to convey the lime to the eductor.

15. The spreader of claim 12 having two of the eductor; and two elongated flexible tubes, each one connected to the outlet of a corresponding one of the two eductors.

16. A lime spreader comprising a wheeled frame having a container to carry the lime; an eductor having a lime inlet positioned to receive lime from the container, an air inlet, and an outlet; means to convey the lime in the container to the eductor; an elongated flexible tube connected to the outlet of the eductor; and means to activate the eductor to blow lime through and out the tube; wherein the eductor has a chamber having an inlet side opposite an outlet side, and an opening connected to the container, an inlet nozzle oriented into the chamber on the inlet side, and a converging-diverging outlet section receiving mixed air from the inlet nozzle and lime from the opening, extending away from the outlet side of the chamber.

* * * * *